United States Patent
Anderson et al.

(10) Patent No.: US 7,111,268 B1
(45) Date of Patent: Sep. 19, 2006

(54) POST-LAYOUT OPTIMIZATION IN INTEGRATED CIRCUIT DESIGN

(75) Inventors: Jason H. Anderson, Toronto (CA); Sandor S. Kalman, Santa Clara, CA (US); Vinay Verma, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 381 days.

(21) Appl. No.: 10/644,132

(22) Filed: Aug. 20, 2003

Related U.S. Application Data (60) Provisional application No. 60/406,137, filed on Aug. 26, 2002.

(51) Int. Cl.
*G06F 17/50* (2006.01)

(52) U.S. Cl. ............... 716/11; 716/9; 716/10

(58) Field of Classification Search .......... 716/8–14
See application file for complete search history.

(56) References Cited

U.S. PATENT DOCUMENTS

| | | | | |
|---|---|---|---|---|
| 6,249,902 | B1 * | 6/2001 | Igusa et al. ............ | 716/10 |
| 6,782,520 | B1 * | 8/2004 | Igusa et al. ............ | 716/9 |
| 6,871,336 | B1 * | 3/2005 | Anderson .............. | 716/9 |
| 2001/0049814 | A1 * | 12/2001 | Matsumoto et al. ...... | 716/10 |
| 2003/0009734 | A1 * | 1/2003 | Burks et al. ........... | 716/6 |

OTHER PUBLICATIONS

Vaughn Betz, Jonathan Rose; "FPGA Routing Architecture: Segmentation and Buffering to Optimize Speed and Density"; 10 pages.

Dijkstra, E. ; A Note on Two Problems in Connexion with Graphs, Numerische Mathematik 1; 1959; 2 pages. [attached publication from book: 25.2 Dijkstra's algorithm—pp. 527-531.

L. McMurchie, C. Ebeling; "PathFinder: A Negotiation-Based Performance-Driven Router for FPGAs"; Proc. of the Feb. 1995; 1995 ACM Third International Symposium on Field-Programmable Gate Arrays Aided Design; 7 pages.

C. Changfan, Yu-Chin Hsu, Fur-Shing Tsai; "Timing Optimization on Routed Designs with Incremental Placement and Routing Characterization"; IEEE Transactions on computer-Aided Design of Integrated Circuits and Systems; vol. 19, No. 2; Feb. 2000; pp. 188-196.

Amir H. Ajami, Massoud Pedram; "Post-Layout Timing-Driven Cell Placement Using an Accurate Net Length Model with Movable Steiner Points"; ASIA South Pacific DAC; Copyright 2001; pp. 595-600.

Konrad Doll, Frank M. Johannes, Kurt J. Antreich; "Iterative Placement Improvement by Network Flow Methods"; IEEE Transactions on Computer-Aided Design of Integrated Circuits and Systems; vol. 13, No. 10; Oct. 1994; pp. 1189-1200.

* cited by examiner

*Primary Examiner*—Jack Chiang
*Assistant Examiner*—Binh Tat
(74) *Attorney, Agent, or Firm*—Kim Kanzaki; Robert Brush (57) ABSTRACT

A method for post-layout timing optimization is disclosed. The method performs timing analysis on a design to obtain timing information such as critical paths and slack values. Incremental placement based on the timing information is performed. A new routed design is generated by applying incremental routing to the result of incremental placement. The routed design is stored if its performance is better than the previous routed design. The above steps are repeated until a predetermined criterion is met.

12 Claims, 6 Drawing Sheets

POST-LAYOUT OPTIMIZATION IN INTEGRATED CIRCUIT DESIGN

FIELD OF THE INVENTION

This invention relates to computer-aided design (CAD), and specifically, to a method for post-layout optimization of the placement and routing of an integrated circuit.

BACKGROUND OF THE INVENTION

The design process for integrated circuits contains a number of well known sequential operations. Initially, the proposed functionality of a circuit is analyzed by one or more chip designers. These designers then use design capture tools to describe the logical components of the circuit and their interactions. This step involves generating a description of the design to be implemented in an appropriate machine-readable form. One of the commonly used methods for specifying a design is a hardware description language (HDL). This language contains specific functions and syntax to allow complex hardware structures to be described in a compact and efficient way. Computer-aided design tools are available to compile or synthesize the HDL description specifying the design into lower forms of description. The output of these synthesis tools is a design database specifying the components of the design and how the components are interconnected. The components of a design may consist of large blocks that implement complex logic functions, memory blocks, logic gates, or other types of components.

The design database is then passed as input to a layout tool, which typically includes a placement tool (placer) and a routing tool (router). Placement is the process whereby each component (or design object) of the design is allocated to a physical position on an integrated circuit (chip). The aim of the placer is to place connected design objects in close physical proximity to one another. This conserves space on the chip and increases the probability that the desired interconnections between components will be successfully completed by the router. Additionally, placing connected components close to one another generally improves the performance of the circuit, since long interconnect paths are associated with excess capacitance and resistance, resulting in longer delays.

After placement is complete, a routing step is performed. Many routing algorithms use a routing resource graph, G(V, E), to represent the available routing resources in the target device, where a node, n∈V, in the graph represents a conductor (wire) in the device and an edge, e∈E, is present between nodes corresponding to conductors that can be electrically connected to one another. For example, in FPGA technology, edges are present between nodes whose conductors may be connected to one another through a programmable switch. Each component in the design being routed has a number of pins, which generate and receive electrical signals. Pins that generate signals are called source pins; pins that receive signals are called load pins. Each component pin corresponds to a node in the routing resource graph. A collection of pins that needs to be connected together is called a net. The purpose of routing is to connect the pins in each net of a logic design. A net may have one or more source pins and one or more load pins. Signals are fed from source pins to load pins through an interconnection path chosen by the router. To route a load pin on a net, the router must identify a path through the routing resource graph from a source pin's node in the graph to the load pin's node in the graph. Each node in the graph has an associated cost, which is typically chosen based on a combination of factors, including the physical properties of the node's corresponding conductor (such as wire capacitance or wire length), as well as other factors related to the design being routed (such as the demand for the node amongst the nets of a design). When a load pin is routed, it is desirable to use the minimum cost path from the source pin to the load. The minimum cost path is usually identified using a variant of Dijkstra's shortest path algorithm. More details can be found in Dijkstra, E., A Note on two Problems in Connexion with Graphs, Numerische Mathematik 1, 269–271, 1959.

After placement and routing, it is often necessary to verify that the design functions in ways expected by the designer. This verification may be achieved by simulation and analysis. During post-layout verification, the operation of the design is examined. After routing, the precise resistances and capacitances of a design's interconnections are known and consequently, post-layout timing analysis tools have an accurate picture of the circuit delays. Timing analysis tools can identify paths with excessive delay, detect setup and hold violations, and other timing errors. Other post-layout verification tools may check that the design functionality is correct and that it produces the correct output results for given input stimulus vectors. If post-layout verification is successful, the design process is complete and the design is implemented in the target technology. On the other hand, if verification is not successful, then incremental modifications to the design may be necessary, after which the design must again pass through some or all of the CAD flow. It is desirable if such iterations through the CAD flow after incremental circuit modifications can be performed quickly.

The design tools involved in the CAD flow that are used for HDL synthesis, placement and routing, verification and timing analysis of a design are commonly implemented in software executing on an engineering workstation.

Placement and routing have significant effects on the performance of resulting circuit. If their solutions are not optimal, there may be excessive capacitance and resistance, leading to unacceptable delays and signal degradation. Further, placement and routing are computationally intensive operations, and it is desirable to reduce their execution times. Consequently, it is important to develop improved placement and routing methods and processes.

DETAILED DESCRIPTION OF THE INVENTION

The present invention relates to a new method for post-layout timing optimization. In the following description, numerous specific details are set forth in order to provide a more thorough understanding of the present invention. However, it will be apparent to one skilled in the art that the present invention may be practiced without these specific details. In other instances, well-known features have not been described in detail in order to avoid obscuring the present invention.

Figure 1A:
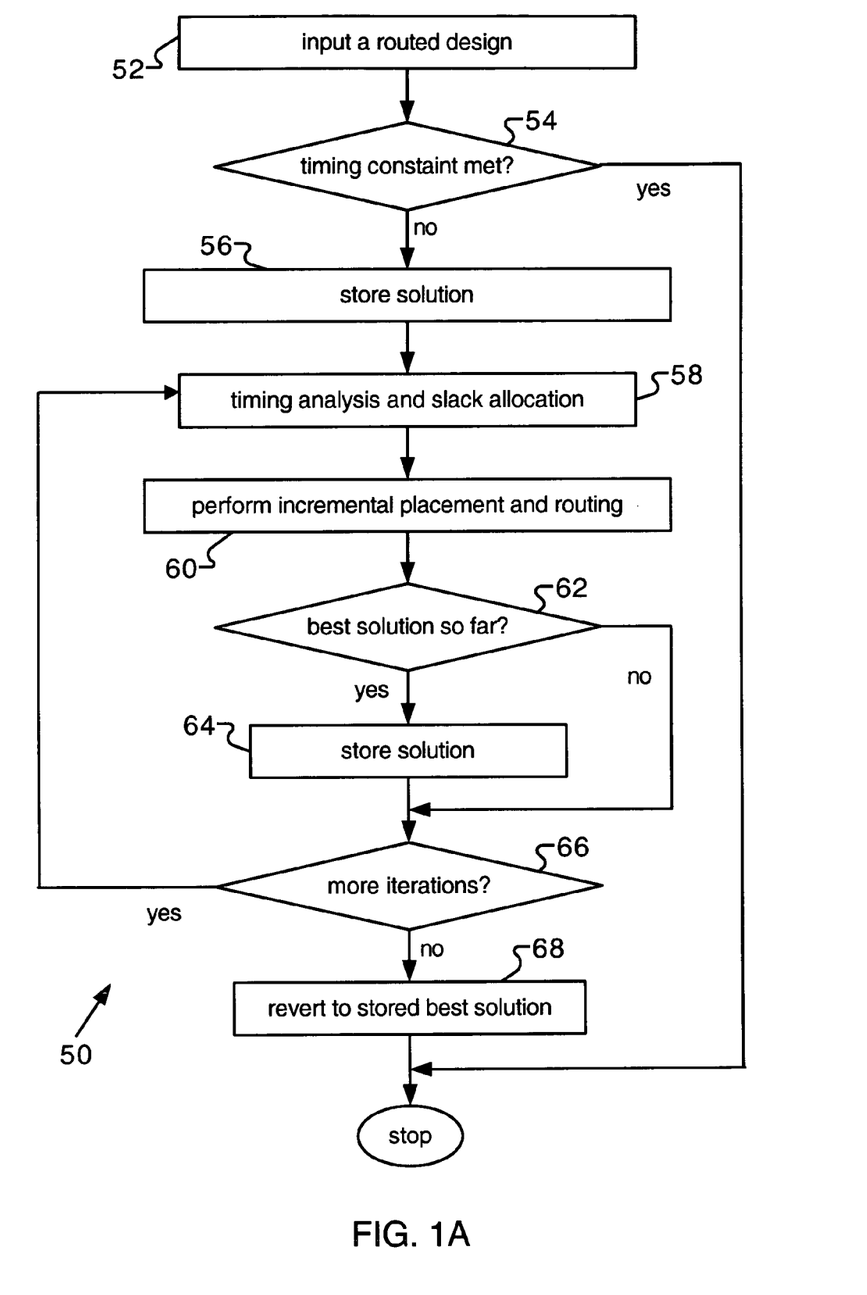
FIGS. 1A and 1B are flow charts showing an overview of a post-layout timing optimization method of the present invention.

FIG. 1A is a flow chart showing an overview of a post-layout timing optimization operation 50 of the present invention. In step 52, a routed design is accepted for processing. In step 54, timing analysis is performed to determine whether timing constraints have been met. If the constraints have been met, operation 50 terminates. If the constraints have not been met, the original placement and routing solution for the design is stored (step 56). In step 58, timing analysis and slack allocation operations are performed. In this step, the actual routed connection delays of the design are preferably used and thus, the result is an accurate picture of the design's critical paths as well as a slack value for each connection in the design that is covered by the design's timing constraints. The slack value for a connection is the difference between the connection's required delay and its actual delay; connections with negative slack reside on paths that are not meeting timing constraints. Generally, it is these negative slack connections whose delays need to be improved if the design is to meet timing constraints.

Using the information from step 58, an incremental placement and incremental routing is performed (step 60). In step 62, the quality of the complete placement and routing solution (obtained from step 60) is evaluated. Quality is typically measured in terms of how close the solution is to meeting user timing constraints. If the new solution is the best solution, the solution is stored (step 64). Operation 50 then determines whether another iteration needs to be performed (step 66). The decision to perform additional placement and routing is typically based on whether the solution has met timing constraints and whether further improvement is possible. If more placement and routing is needed, operation 50 branches back to step 58. If no more iterations need to be performed, operation 50 stops.

One feature of the above-described operation is that there will be no degradation in solution quality by implementing the present invention. This effect is realized by always storing the best placement and routing solution encountered, in steps 56 and 64 of operation 50. At the end of operation, the best placement and routing solution is "resurrected" and it becomes the final placement and routing solution for the design. In another embodiment of the invention, the solution retrieved in step 68 is subjected to additional processing to further improve its quality.

Figure 1B:
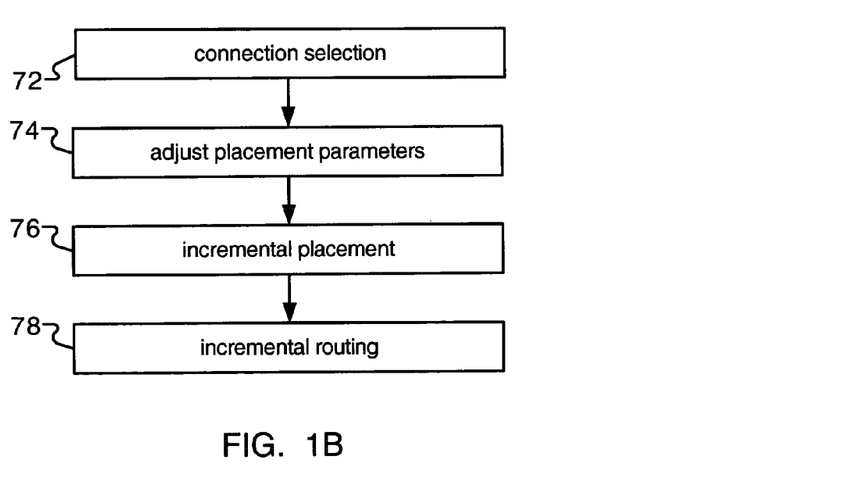

Details of the incremental placement and incremental routing operations of the present invention (step 60 of FIG. 1A) are shown in FIG. 1B. In one embodiment of the present invention, incremental placement is performed first, followed by incremental routing. A module that performs incremental placement is called an incremental placer, and a module that performs incremental routing is called an incremental router. The inputs to the incremental placer are selected (step 72). In the present invention, they are a set of connections whose placement should be improved by incremental placer. For example, they are selected on the basis of their slacks as well as other design characteristics (e.g., the number of critical paths through these connections, where a path in a circuit is referred to as critical if its delay exceeds user constraints). Note that in another embodiment of the invention, connections may be selected based on criteria unrelated to the design's timing constraints. For example, connections in the vicinity of routing congestion or connections that are difficult to route may be selected for placement improvement. The incremental placer operates only on these selected connections and consequently its run-time is proportional to the number of connections to improve, rather than the total number of connections in a design or the number of design objects. As a result, the run-time taken for incremental placement is much less than the time taken for a complete placement.

A second advantage of connection-based incremental placement is that it is possible to control the granularity of changes made to the placement and routing solution. For example, one may choose to pass in a very small number of connections to improve, which will result in very few placement changes. Such an approach may be desirable if the design is very close to meeting timing constraints, having few connections with negative slack. Conversely, if a design is not close to meeting timing constraints, it may be desirable to pass in a large number of connections to improve, resulting in larger changes to placement, routing and design performance.

In step 74, placement parameters are selected and their values are adjusted, if necessary, in each iteration. One of the potential issues with any automated layout system is timing convergence or closure. This generally refers to the capability of the system to produce solutions that are increasingly close to meeting timing constraints, without oscillations in quality. In the system of the present invention, the potential for oscillations is reduced or eliminated through the use of parameters supplied to the incremental placer. One of these parameters specifies the distance that objects may be moved. This parameter can be set so that the distance that objects may be moved in successive calls to incremental placement decreases gradually. For example, in early calls to incremental placement, one may allow for large placement changes with objects moving long distances. In later calls, the allowable movement distance is decreased, which results in smaller changes being effected in incremental placement. Smaller placement changes imply smaller changes in solution quality. Hence, the placement and routing solution can be "forced" to converge in this manner.

A second parameter that affects both convergence and quality is the notion of "connections to consider". For example, consider three design objects (X, Y, and Z) and two connections (C1 between X and Y and C2 between Y and Z). One of the connections (e.g., C1) has a slack of −100 and therefore, it must be improved if the design is to meet timing constraints. However, the second connection C2 has a slack of 25 and this connection may become critical if its delay is increased. The incremental placer of the present invention takes such situations into account when optimizing connection placements. In this case, the near-critical connection between design objects Y and Z will affect how the connection between objects X and Y is improved. For example, it is desirable to move object X towards object Y rather than moving Y towards X. The notion of "considering" connections helps prevent oscillations from occurring. Without this, in the example, the placer may decide to optimize the negative slack connection by moving Y towards X, making the connection between objects Y and Z critical (have negative slack). When the placer tries to optimize this new negative slack connection, the connection between objects X and Y may again become critical.

A third parameter to the incremental placer is the ability to specify certain design objects as locked. This parameter can be used to aid convergence. For example, in the early placement and routing iterations, the majority of design objects can be classified as "moveable", meaning that their placements may be changed. As the iterations progress, more and more of the objects can be classified as being "locked". The decision to lock an object may depend on its movement in prior iterations or on other criteria. Similar to the parameter that controls the allowable movement distance, the locking of objects implies that fewer changes to the placement and routing solution are allowed, which helps convergence.

In step 76 of FIG. 1B, incremental placement is performed. In step 78, incremental routing is performed based on the result of step 76.

Figure 2A:
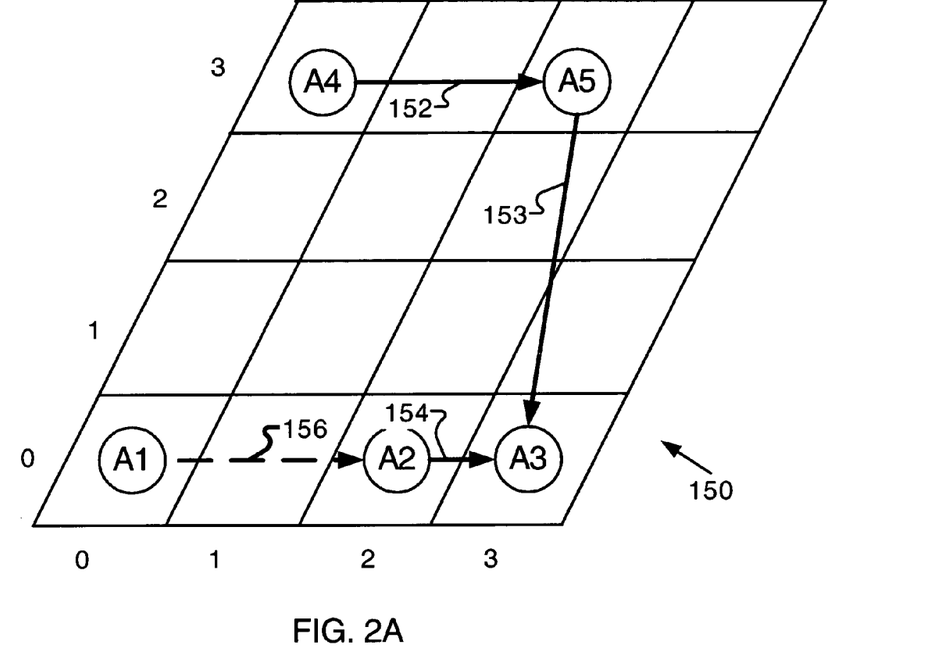
FIG. 2A shows an exemplary grid that can be used in the present invention.

In order to facilitate the implementation of the present invention, a coordinate system is set up to identify the location of design objects. In one embodiment, the space in a PLD used for placing design objects is conceptually divided into rectangular or square grids using horizontal and vertical lines. An exemplary grid 150 is shown in FIG. 2A. The vertical lines are shown slanted to facilitate three dimensional viewing, which will become clear in connection with FIG. 2B. A coordinate system is used to mark positions of grid 150. In FIG. 2A, each square is uniquely identified by a horizontal and a vertical value, starting from 0. A plurality of design objects used in incremental placement, shown as labeled circles in FIG. 2A, are positioned in some of the squares. In FIG. 2A, sixteen squares and five design objects (labeled A1 to A5) are shown. It should be noted that the present invention is applicable to any number of squares and design objects.

The design objects are connected by connections. FIG. 2A shows the two types of connections that are relevant to our incremental placer (other connections between the design objects are not shown): (a) connections to optimize, shown as solid lines 152–154, and (b) connections to consider, shown as dashed line 156. In the present invention, the "connections to optimize" are the connections in the design that do not meet the user's timing constraints. The incremental placer of the present invention attempts to improve the delay of these connections which generally involves bringing the driver and load of each connection closer together. The "connections to consider" are the connections that are marginally meeting timing constraints, i.e., if the delays of these connections are increased too much, they will no longer meet timing constraints. An actual design may have many connections of each type, and the number of connections shown in FIG. 2A is illustrative only. The connections to optimize are preferably a subset of the timing critical connections in a design. The goal is to improve the placement of these connections, allowing the design to meet requirements (e.g. timing constraints). The set of connections to consider preferably consists of near-critical connections whose placements do not necessarily need to be improved, but whose placements should not be greatly disrupted or made worse.

One aspect of the present invention is that design objects that are attached to the connections to optimize are movable. In the present invention, a third type of connection, called an anchoring connection, is introduced. The purpose of an anchoring connection is to "anchor" movable design objects to their old placement positions, thus encouraging objects to not stray far from their old locations. The anchoring connections are applied to design objects that need to be incrementally placed. By changing the weights of the anchoring connections, it is possible to have direct control over how far objects are allowed to be moved by the incremental placer.

Figure 2B:
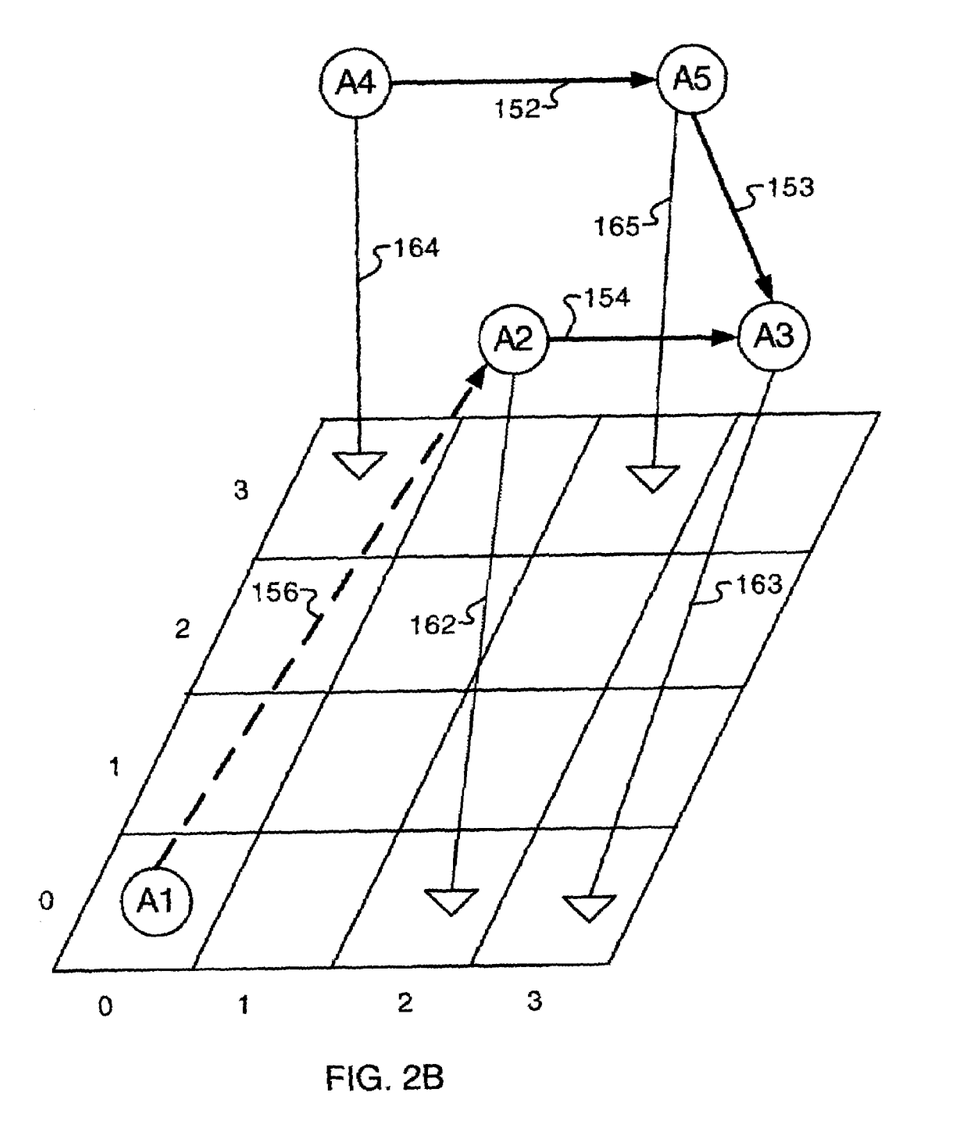
FIG. 2B shows anchoring connections that can be used in the present invention.

FIG. 2B shows the three kinds of connections. The grids, design objects, connections to optimize, and connections to consider are the same as that in FIG. 2A. Elements that are common in FIGS. 2A and 2B have the same reference numerals. In FIG. 2B, the "moveable" design objects have been unplaced from their old placement locations. The unplaced objects are shown raised above the placement grid. Anchoring connections 162–165 connect unplaced design objects A2–A5 to their old placement locations. In FIG. 2B, design object A1 does not attach to a connection to optimize and therefore, object A1 is not moveable and does not undergo incremental placement. Consequently, there is no need to introduce an associated anchoring connection for object A1.

Figure 3:
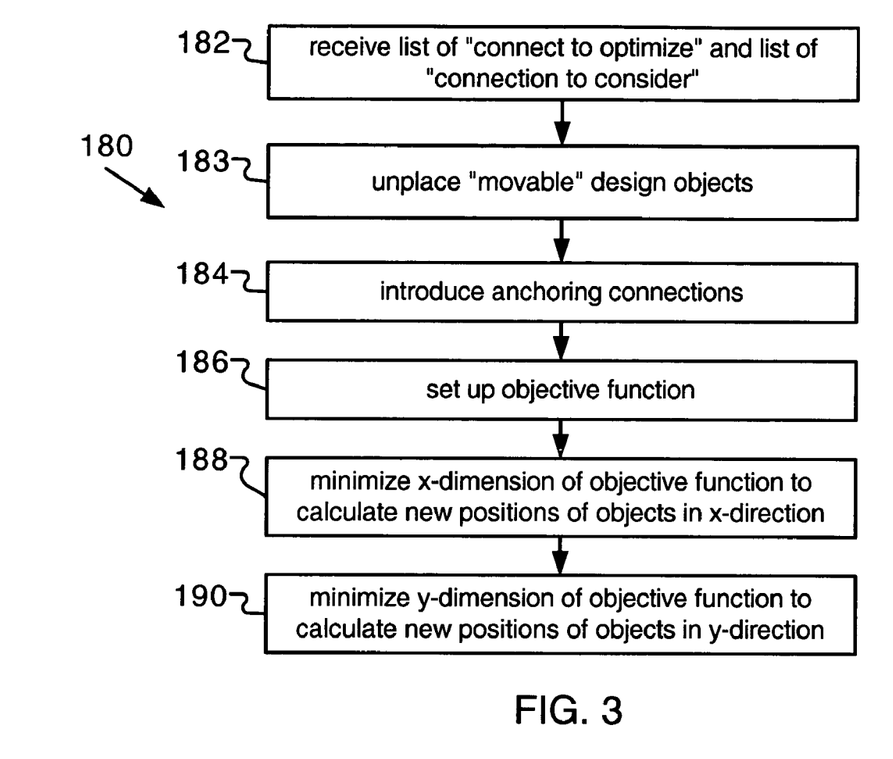
FIG. 3 is a flow chart of an incremental placer of the present invention.

FIG. 3 is a flow chart 180 showing the steps used in an incremental placer to calculate new positions of the design objects that undergo incremental placement. In step 182, the list of "connections to optimize" and list of "connections to consider" are obtained from the result of a conventional placer and router. In step 183, design objects that attach to a connection to optimize are unplaced. These unplaced design objects are referred to as the moveable objects. In step 184, anchoring connections are introduced into the design to connect the unplaced design objects with their old placement locations. The weights associated with each of the anchoring connections can be entered by a design engineer or generated automatically by software tools.

Once the list of connections to optimize and consider are processed and the anchoring connections have been introduced, an objective function $\Phi$ can be written as follows:

$$\Phi = \sum_{conn_i \in S_{opt}} w_{conn_i} \cdot L(conn_i) + \sum_{conn_i \in S_{consid}} w_{conn_i} \cdot L(conn_i) + \sum_{conn_i \in S_{anchor}} w_{conn_i} \cdot L(conn_i)$$

where
$S_{opt}$ represents the set of connections to optimize,
$S_{consid}$ represents the set of connections to consider,
$S_{anchor}$ represents the set of anchoring connections,
$conn_i$ represents a connection in one of the sets,
$w_{conn_i}$ represents a scalar weight, and
$L(conn_i)$ represents the length of the connection $conn_i$.

The goal is to find a placement solution that minimizes the objective function.

In the above equation, $w_{conn_i}$ is a scalar weight that represents the importance of $conn_i$ and $L(conn_i)$ represents the length of the connection $conn_i$. For the case of connections belonging to $S_{opt}$ and $S_{consid}$, the value for $w_{conn_i}$ is preferably chosen based on criticality, with highly critial connections receiving higher weights than less critical connections. Connection weights may also be chosen using criteria other than timing criticality, for example, net characteristics such as net fanout or connection length. In the case of connections belonging to $S_{anchor}$, the values for $w_{conn_i}$ are chosen based the desired distance that design objects are allowed to move from the locations they occupied prior to being unplaced. Larger values of $w_{conn_i}$ for this set of connections imply smaller placement changes. In one embodiment, the length of a connection is measured by its squared Euclidean distance. For example, for a given $conn_i$ representing a connection between two design objects, k and j, its length is:

$$L(conn_i) = (x_j - x_k)^2 + (y_j - y_k)^2$$

where $x_j$, $y_j$, $x_k$ and $y_k$ represent the placements of objects j and k in the x and y dimensions. Note that when $conn_i$ corresponds to an anchoring connection or a connection to consider, one of the two points (either $x_j$, $y_j$ or $x_k$, $y_k$) may be fixed.

In the present invention, the placement of objects is determined by mimizing the objective function $\Phi$. This will give rise to a set of equations, the solution of which is the placement of the objects. The solution can be found by minimizing the objective function separately in the x and y dimensions. Specifically, the objective function can be written in the following form:

$$\Phi = \Phi_x + \Phi_y$$

where $\Phi_x$ represents the parts of the objective function relating to the x-dimension and $\Phi_y$ is the part relating to the y-dimension. Function $\Phi_x$ can be mimimized separately from $\Phi_y$. This is the basis for steps 188 and 190 in FIG. 3.

$\Phi_x$ can be expressed in matrix form as:

$$\Phi_x = \frac{1}{2}\vec{x}^T A \vec{x} - \vec{b}^T \vec{x} + const$$

where const is a constant value and $\vec{x}$ is an n-dimensional vector representing the placements of the moveable design objects in the x-dimension. A is an n-by-n matrix and b is an n-dimensional vector. n represents the number of variables in the equation system; there is one variable for each moveable design object. The second term, $\vec{b}^T\vec{x}$, exists as a result of connections to fixed objects or fixed locations (which reflect the connections to consider and the anchoring connections).

To minimize function $\Phi_x$, the partial derivative is taken with respect to each of the n different x variables, producing a system of n linear equations. Setting these linear equations to zero and solving the system will yield a set of values for $\vec{x}$ corresponding to the minimum of function $\Phi_x$. The system of linear equations has the following form:

$$A\vec{x} - \vec{b} = 0$$

Note that an equivalent system of equations must be solved to yield the vector of placements, $\vec{y}$, in the y-dimension. The system of linear equations can be solved using standard techniques, such as the conjugate gradient method, yielding a placement for each design object in a real-valued coordinate system.

Notice that in this formulation, there are no constraints that prohibit objects from overlapping one another. Consequently, in the resulting placement, objects may be placed overlapping with other design objects. In conventional placers, complex overlap removal techniques are used to remove the overlaps. One aspect of the incremental placer of the present invention is that overlap removal tools are not needed. As can be seen from the above, the present incremental placer often deals with only a small number of moveable design objects (relative to the total number of design objects). Thus, the number of overlaps that is created is relatively small. As a result, the present invention does not need to perform overlap removal (although it may be performed if desired), and the placer proceeds directly to a fitting step in which the real-valued placement locations, that result from solving the system of equations, are used to determine a placement for the design objects on the physical layout grid.

Figure 4:
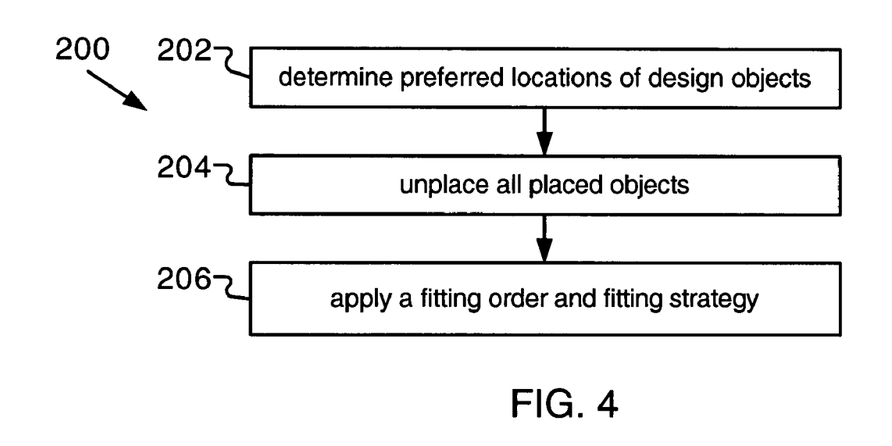
FIG. 4 is a flow chart showing a fitting procedure of the present invention.

FIG. 4 is a flow chart showing a fitting procedure 200 of the present invention. In step 202, the preferred locations of the design objects are determined. This is performed in one of two ways:

For the objects that were designated as movable in connection with the incremental placer shown in flow chart 180, the preferred placement locations are taken from the placement values in the $\vec{x}$ (and $\vec{y}$) vector that results from solving the system of equations described therein, or for objects that remain unmoved after the steps of flow chart 180 are performed, their preferred location are set to be equal to their current placement.

After the preferred locations are determined, all the placed objects are unplaced (step 204). The preferred placement values are used as a guide for fitting. The design objects are then sorted into a specific "fitting order" that determines the order in which objects will be fit (or placed) onto the physical grid. Objects that are fit first are most likely to be placed at or close to their preferred location. For example, a fitting order may favor design objects that are attached to a connection to optimize. After ordering the objects, each object is considered in turn and a fitting strategy is applied. One strategy is to employ a simple breadth-first fitting algorithm. For each object to fit, its preferred location is tried first. If that location is already occupied, the object is fit to one of the locations that neighbor the preferred location. If these locations are also occupied, the search continues outward, until a vacant location is found.

It should be noted that if a PLD contains specific hardware features, they should also be taken into account in fitting. These are device specific issues that are best handled on a case-by-case basis.

One advantage of the present invention is its simplicity: its formulation is a system of linear equations. This is a convex optimization problem with a single solution that can be solved using well-known mathematical techniques. On the other hand, many prior art incremental placement methods are non-convex and therefore cannot be solved using standard quadratic programming techniques.

Another advantage of the present invention is the size of its problem formulation, which is proportional to the number of connections to optimize and consider, and is not proportional to the size of the entire design. In particular, if there are c connections in the list of connections to optimize, the number of variables is less than or equal to 4c (2c variables for the x-dimension and 2c variables for the y-dimension). The run-time needed to formulate and solve the system of linear equations of the present invention is proportional to the number of variables in the system. Since the number of connections to optimize and consider is generally much smaller than the total number of connections in the design, the run-time incurred by using the incremental placer of the present invention is substantially less than that needed to compute a new placement for all design objects.

One more advantage is the ease with which the allowable amount of change to an existing placement can be controlled. As described above, an anchoring connection is used to control the extent of movement of a movable object. For example, the weight assigned to an anchoring connection can be set to a very low value, thereby allowing the object to move freely towards the objects it connects to. Alternately, a very high weight could be assigned, thereby forcing the object to remain close to its old placement position.

Figure 5:
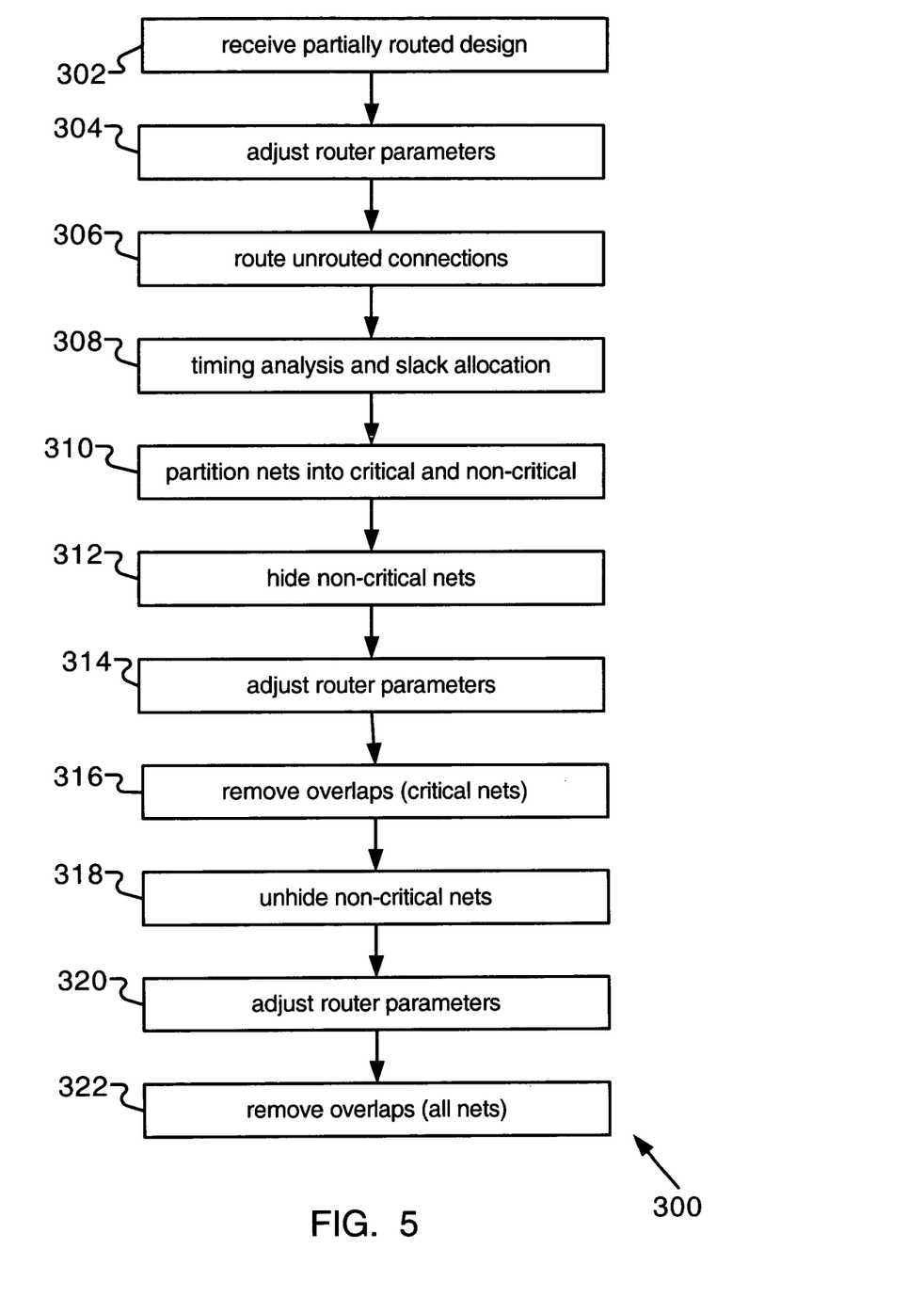
FIG. 5 is a flow chart showing an overview of an incremental router flow of the present invention.

After the incremental placement is performed, an incremental routing step follows. FIG. 5 is a flow chart showing an overview of a router 300 of the present invention. In step 302, a partially routed design is received by the router. This design contains a plurality of nets that have not yet been routed. In step 304, parameters of the router are adjusted so that they are appropriate for this phase of incremental routing. Details of the choice of parameters will be disclosed below. In step 306, the unrouted pins in the design are routed. During this routing, it is permissible to create shorts between other nets and therefore, the result of this step is a completely routed design that generally contains shorts or overlaps between the routing for different nets. The overlaps between nets must be removed completely for the routing solution to be feasible. In one embodiment of the invention, shorts between nets are not removed and step 60 in operation 50 (FIG. 1A) proceeds directly to step 62 with an overlapped routing solution. In this case, subsequent timing analyses and slack allocations in step 58 may be done on the basis of an overlapping routing solution. In another embodiment of the invention, overlap (short) removal is required and is achieved by repeatedly selecting a net that is shorted with another net, ripping up a portion of the routing of the selected net, and re-routing the selected net with an increasing preference for avoiding the creation of new shorts with other nets. Additional details of this process can be found in L. McMurchie and C. Ebeling, "PathFinder: A Negotiation-Based Performance-Driven Router for FPGAs", Proc. of the 1995 ACM Third International Symposium on Field-Programmable Gate Arrays Aided Design, pp. 111–117, February 1995. Returning to operation 300 in FIG. 5, in step 308, timing analysis is performed. This step may include calculating a slack value for each connection in the design. This slack value represents the criticality of the connection in terms of the design's timing constraints. A connection with a small slack is more timing critical than a connection with a large slack. The result provides an accurate picture of whether the design meets timing constraints. The subsequent steps pertain to removing the overlaps between nets to produce a feasible routing solution.

In step 310, the nets in the design are divided into two sets: critical and non-critical. In this embodiment, the critical nets are those that have connections with tight timing constraints, as determined in step 308. A threshold value can be used for the classification. For example, a net is a "critical" net if any pin on the net has a slack (determined in step 308) that is less than the threshold value. The threshold value can be determined on a case-by-case basis in accordance with user's requirements. In another embodiment, the nets may be partitioned using information from prior steps in the routing flow. Specifically, one can keep track of whether a pin on the net has been critical (e.g., had a slack less than a threshold value) in any of the previous route processing. If a pin on the net had been critical, then the net can be classified as critical in this step.

One aspect of the present invention is that the overlaps of the critical nets and non-critical nets are removed in separate operations. The rationale behind this is to give the critical nets the best opportunity to use the most desirable routing resources, for example, those with the best delay characteristics. The separation of the two overlap removal operations is realized by "hiding" the routing for the non-critical nets prior to removing overlaps from the critical nets (step 312). As a result, resource contentions from hidden nets are not "seen" during overlap removal from the critical nets. In step 314, the router parameters are adjusted so that they are appropriate for this phase of the operation. In step 316, overlaps are removed from the critical nets. After this overlap removal step, an overlap-free routing solution for the critical nets is generated.

In executing step 316, only critical nets that are shorted with other critical nets are considered for rip-up and re-route. The shorts between a critical and a non-critical net are not recognized, i.e., these shorts would not lead to the rip-up and re-route process. In order to achieve this objective, the non-critical nets are ignored (or "hidden") in these steps. The non-hidden nets will compete amongst themselves for routing resources, without competition from the hidden nets.

After the critical nets are routed, the non-critical nets are tackled. In step 318, the non-critical nets are unhidden. Unhiding a net is akin to making an invisible net visible to all other unhidden nets, i.e., it can contend for routing resources. Also shorts between this net and other nets are recognized by the router. At this point, overlaps may exist between non-critical nets and between critical and non-critical nets. In step 320, the router parameters are adjusted so that all remaining overlaps between nets can be removed. Overlap removal is invoked in step 322. After the completion of step 322, the result is an overlap-free, feasible routing solution for all nets in the design. In another embodiment of the invention, the nets are partitioned into more than two sets, based on timing criticality. For example, assume the nets were divided into three sets: A, B, and C, with set A containing the most critical nets. Overlaps would first be removed from the nets in set A. Following this, overlaps would be removed amongst the nets in sets A and B. Finally, overlaps would be removed in all of the nets, in sets A, B, and C.

The steps of adjusting router parameters (steps 304, 314 and 320) and routing unrouted connections (steps 306, 316 and 322) are described in detail here. In general, a router uses cost functions to evaluate routing decisions. To route a load pin on a net, the router identifies the minimum cost path through the routing graph from a source pin of the net to the load pin. The cost of a path is defined to be the sum of the individual node costs on the path. In one embodiment, the cost function C(n) of a node n can be written as:

$$C(n)=[\text{In\_cost}(n)+\text{Cong\_hitory}(n)][1+\text{Share\_pen}*\text{contenders}(n)]+\text{Delay}(n) \quad (1)$$

where:

In_cost(n) is the basic (or intrinsic) cost of using node n;

Cong_history(n) is a scalar that represents the history of congestion on node n;

Share_pen is a scalar value representing the cost of creating shorts between nets;

Contenders(n) is the number of nets currently using node n; and

Delay(n) is the cost related to the delay incurred through the use of the node n.

Note that equation (1) is just one of many ways to compute the cost of node n. Further, some of the terms in equation (1) may be zero. Other cost functions may include terms related to physical properties of the conductor corresponding to the node, such as capacitance or metal wire topology.

The selection of router parameters under steps 304, 314 and 320 is now described. In one embodiment, it is desirable to exert a minimal impact on already routed nets. Therefore, it is desirable to minimize the number of new shorts that are created in routing the unrouted pins. If equation (1) is used as the cost function, this can be achieved by setting the share_pen and cong_history(n) parameters to appropriate values. Specifically, before starting to route the unrouted pins, the share_pen parameter is set to a high value so as to minimize the creation of new shorts while allowing shorts to be created when warranted by connection criticality. For example, for a highly critical net, it may be desirable to route onto a fast routing resource even if that resource is already used by another net. Another way to achieve a similar effect is to use the cong_history parameter. For example, the cong_history parameter of the nodes (conductors) used in the routing of already-routed nets can be set to a high value, thereby penalizing the use of these nodes by other nets. In another embodiment, it may be desirable to adjust router parameters so that certain nets are given preference for the most desirable routing resources (for example, the routing resources with the least delay). In step 320, the overlaps amongst the critical nets have already been removed. It is desirable if during the overlap removal process for all nets (step 322), the routing for the critical nets is disrupted as little as possible when removing the overlaps from the non-critical nets. This can be accomplished by adjusting the cong_history parameter for the nodes used in the routing of the critical nets, and then, when removing overlaps in step 322, establishing a preference within the router for the rip-up and re-route of non-critical nets versus critical nets.

Figure 6:
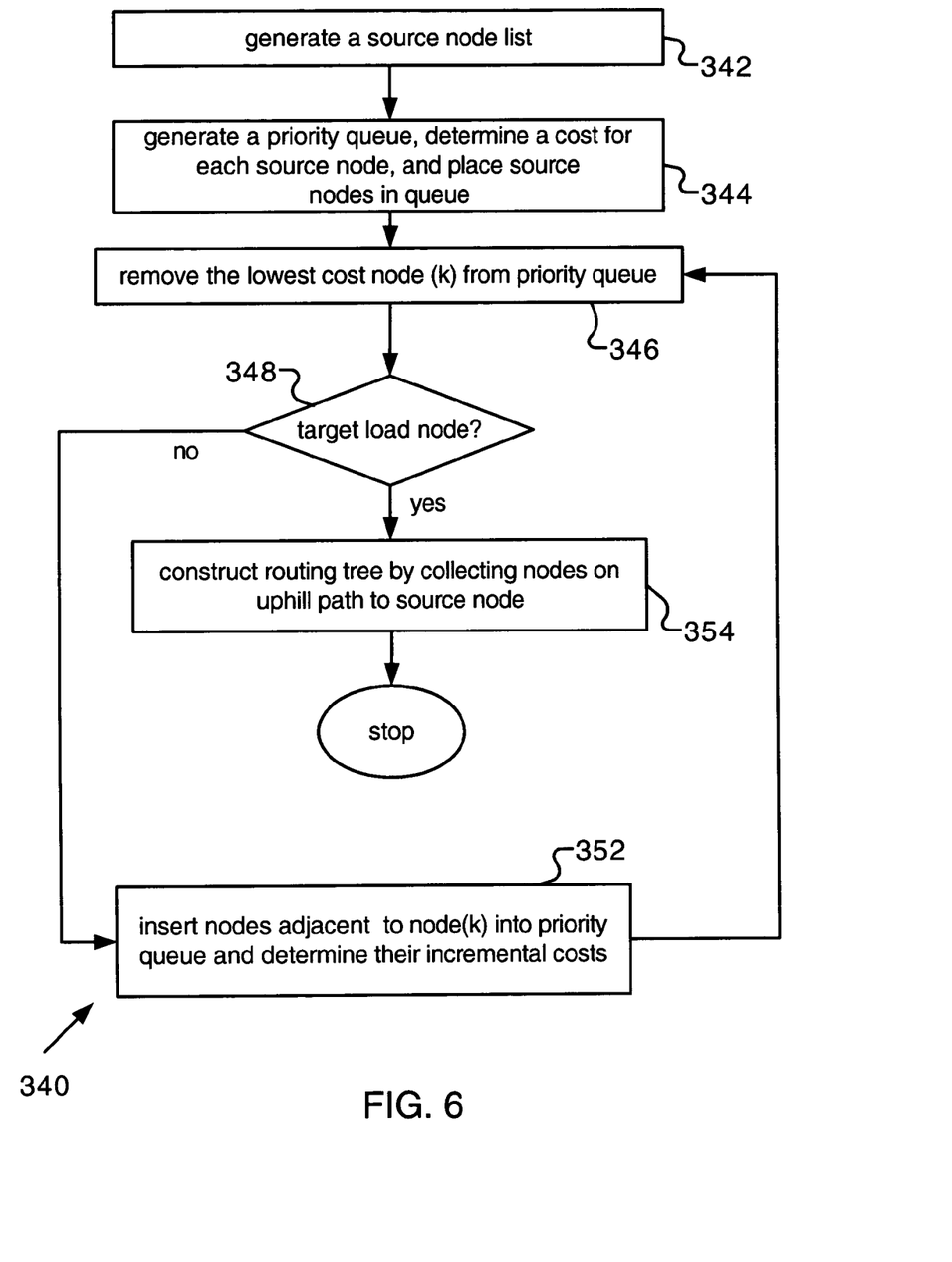
FIG. 6 is a flow chart of the steps in routing unrouted connections in accordance with the present invention.

An operation 340 of a router that can be used to execute steps 306, 316 and 322 is shown in FIG. 6. The process of FIG. 6 is applicable to route an individual load pin on a net. It can be repeated multiple times for nets with multiple load pins. In step 342, a list of source nodes is generated. The source nodes for a net are those nodes in the routing graph that correspond to conductors that are already part of the net's routing. In step 344, a priority queue is generated. The source nodes are placed in the priority queue, and their costs are determined. The costs of the source nodes can be chosen in various ways. In one embodiment, the costs of the source nodes are zero. In another embodiment, the costs of the source nodes are chosen based on the timing criticality of pins on the net being routed. For example, in this case, a high cost is given to a source node that, if used in the routing of the load pin being routed, will negatively affect the delay of some other pin on the net. In a third embodiment, the costs of source nodes may depend on characteristics of the routing conductors and the connectivity of the routing graph, such as the locations where routing buffers are present. In step 346, the node (denoted by k) having the lowest cost is removed from the priority queue. It is determined whether this node is a target load node (step 348) corresponding to the load pin being routed. If it is not a target node, adjacent nodes to node k are inserted into the priority queue (step 352). The costs of these adjacent nodes are determined (see below). Operation 340 then branches back to step 346. If the node in step 348 is a target node, a routing tree is constructed by collecting all the nodes on the uphill path from the target node to a source node (step 354). This completes the routing between a source node and a load pin.

The cost, PQCost(m), of an adjacent node m in step 352 is determined by:

$$PQ\mathrm{Cost}(m) = PQ\mathrm{Cost}(k) + \mathrm{Cost}(m); \quad (2)$$

where:

Cost(m) is the cost of node m, which can be calculated using equation (1) above; and PQCost(k) is the total cost of node k. The total cost of node k is the sum of the cost of node k as calculated using equation (1) above and the costs of all the nodes on the uphill path from node k to a source node.

It can be seen from the above description that a novel post-layout optimization method has been disclosed. Those having skill in the relevant arts of the invention will now perceive various modifications and additions which may be made as a result of the disclosure herein. Accordingly, all such modifications and additions are deemed to be within the scope of the invention, which is to be limited only by the appended claims and their equivalents.

The invention claimed is:

1. A method for placing and routing a design on an integrated circuit, said design having a plurality of objects, said method comprising:
   (a) performing incremental placement on a routed design;
   (b) generating a new routed design using incremental routing based on results of said incremental placement;
   (c) storing said new routed design if its quality is superior to that of said routed design; and
   repeating said (a), (b), and (c) steps until a predetermined criterion is met and further comprising performing timing analysis prior to step (a) to obtain timing information and selecting a set of connections that need to be improved, wherein said incremental placement operates only on said set of connections, said set of connections selected based on deviation of said timing information from a predetermined constraint.

2. The method of claim 1 wherein said incremental placement is based on said timing information.

3. The method of claim 1 wherein said incremental routing is based on said timing information.

4. The method of claim 1 wherein said quality is measured based on timing performance of said new routed design.

5. The method of claim 1 wherein said incremental placement is based on routing congestion.

6. The method of claim 1 wherein said incremental placement is based on unrouted pins in said routed design.

7. The method of claim 1 further comprising a step of selecting a set of connections that need to be improved, and said incremental placement operates only on said set of connections.

8. The method of claim 1 wherein said incremental placement uses externally supplied parameters to guide its operations.

9. The method of claim 8 wherein one of said parameters is associated with distances said objects can move.

10. The method of claim 9 wherein said distances vary with number of times said incremental placement has been performed.

11. The method of claim 8 wherein one of said parameters is associated with specifying a set of connections to consider.

12. The method of claim 8 wherein one of said parameters is associated with specifying a set of locked objects.

* * * * *